United States Patent [19]

Strubbe et al.

[11] Patent Number: 5,469,206

[45] Date of Patent: * Nov. 21, 1995

[54] SYSTEM AND METHOD FOR AUTOMATICALLY CORRELATING USER PREFERENCES WITH ELECTRONIC SHOPPING INFORMATION

[75] Inventors: Hugo J. Strubbe, Yorktown Heights; Robert McFarlane, New Rochelle, both of N.Y.

[73] Assignee: Philips Electronics North America Corporation, New York, N.Y.

[ * ] Notice: The portion of the term of this patent subsequent to Jun. 29, 2010, has been disclaimed.

[21] Appl. No.: 70,130

[22] Filed: Jun. 1, 1993

Related U.S. Application Data

[63] Continuation-in-part of Ser. No. 889,201, May 27, 1992, Pat. No. 5,223,924.

[51] Int. Cl.⁶ .................................................... H04N 7/10
[52] U.S. Cl. .................... 348/7; 348/12; 455/5.1
[58] Field of Search .................... 455/2, 5.1, 6.2, 455/68, 70, 186.1, 186.2, 185.1; 348/468, 563, 10, 12, 906; H04N 7/10

[56] References Cited

U.S. PATENT DOCUMENTS

| | | | |
|---|---|---|---|
| 4,706,121 | 11/1987 | Young | 358/142 |
| 4,751,578 | 6/1988 | Reiter et al. | 358/183 |
| 4,977,455 | 12/1990 | Young | 358/142 |
| 5,047,867 | 9/1991 | Strubbe et al. | 358/355 |
| 5,093,718 | 3/1992 | Hoarty et al. | 358/84 |
| 5,223,924 | 6/1993 | Strubbe | 455/5.1 |
| 5,393,713 | 2/1995 | Schwob | 455/186.1 X |

FOREIGN PATENT DOCUMENTS 0572090  5/1993  European Pat. Off. .

OTHER PUBLICATIONS

C. Stanfill et al., "Parallel Free-Text Search On The Connection Machine System", Communications of the ACM, Dec. 1986, vo. 29, No. 12, pp. 1229-1239.

Insight Telecast Inc. brochure.

*Primary Examiner*—Reinhard J. Eisenzopf
*Assistant Examiner*—Philip J. Sobutka
*Attorney, Agent, or Firm*—Michael E. Marion

[57]  ABSTRACT

A system comprising a user interface which can access downloaded electronic shopping information, which can be continually updated and provided either "over the air", over cable or satellite transmission paths or other "fast data" paths, and automatically correlate this information with the preferences of the user, to create and display at least one personalized shopping information database based upon the results of the correlation.

4 Claims, 5 Drawing Sheets

SYSTEM AND METHOD FOR AUTOMATICALLY CORRELATING USER PREFERENCES WITH ELECTRONIC SHOPPING INFORMATION

This application is a continuation in part of U.S. Ser. No. 889,201, filed May 27, 1992 now U.S. Pat. No. 5,223,924 which is incorporated by reference herein.

BACKGROUND OF THE INVENTION

The parent application relates to an improved television interface system which accesses a downloaded TV program information database, which can be continually updated, and which is provided either "over the air", over cable or satellite transmission, or other "fast data" path, and which automatically correlates the information provided thereby with the preferences of the user, to create at least one further program information database based upon the results of the correlation.

The instant application comprises a method and apparatus which utilizes aspects of the parent correlation methodology, to determine the electronic shopping preferences of a user.

U.S. Pat. No. 4,047,867 describes an interface for a TV-VCR system which enabled the user to enter information concerning the user's favorite television programs as well as information about programs stored on video tape. Such information can include program name, broadcast channel, starting time, length, repeat pattern and whether the user wanted the program recorded. The patent further describes an interface system in which such information could be provided in an intuitive and easy manner through the television receiver's PIP display. The teachings of this patent are incorporated by reference herein.

Television systems utilizing downloadable information databases have been described, for example, by Insight Telecast, Inc. and in U.S. Pat. Nos. 4,751,578; 4,706,121 and 4,977,455, which are incorporated by reference herein. Using these systems, TV program information can be downloaded and stored in a memory and used by a processor to control a programmable TV tuner. U.S. Pat. No. 5,093,718 describes a system which can provide such information, including graphics and interactive options, over a "fast data" path which can be a cable, fiber optic or satellite system. Interactive, or "two way" television systems permitting viewer responses to video programming, are described for example, in U.S. Pat. Nos. 5,101,267 and 4,591,906, which are incorporated by reference herein. Integrated data services networks (IDSN) and bidirectional cable systems can also provide this interactivity and have been extensively discussed in the literature. These references are incorporated by reference herein.

In the December, 1986 issue of "Communications of the ACM" (Vol. 29, No. 12, pp. 1229–1239), in an article by Stanfill and Kahle entitled "Parallel Free-Text Search On The Connection Machine System", the method known as "free text search" is described which details a method in which seed words are located which can be used to correlate information provided in one or more portions of text. The teachings of this article are specifically incorporated by reference herein.

SUMMARY OF THE INVENTION

Home shopping programs are popular features of today's broadcast and cable television programming. Products are offered for sale by salesmen and orders are taken from the viewer by telephone. In the near future however, viewers will be able to electronically "browse" through databases transmitted as part of, or along with a television programs, which comprise descriptions of items for sale to the user. Such descriptions can be represented by text and pictures and will be referred to hereinafter as electronic catalog information ("ECI"). Since such ECI data would contain a great many different items which respectively could appeal to many categories of user (i.e. men, women, old, young, sportsmen, musicians, etc.), the instant invention comprises a method and apparatus for correlating the unique characteristics of a particular user, with the items of ECI which are of particular interest to that user.

A preferred embodiment of the invention comprises an interface system which can be used with an interactive television transmission system carrying, along with television programming, an updatable information database containing one or more ECI date which can, for example, include text and picture depictions of merchandise offered for sale to the consumer. The interface system comprises a processor which utilizes "free text" search techniques well known to those skilled in the programming art, such as those taught in the Stanfill and Kahle article incorporated by reference herein.

Another embodiment of the invention comprises a system and method which in addition to correlating items of the ECI with those of interest to the user, comprises means for controlling the audio/video selection, retrieving and display of particular electronic catalogs, and items of the catalogs, at the request of the user, as part of the television display (for example using a PIP function).

Still another embodiment of the invention comprises means for compiling information about a viewers particular tastes, hobbies and other purchasing preferences, for later distribution to advertisers and merchants.

DETAILED DESCRIPTION OF A PREFERRED EMBODIMENT OF THE INVENTION

The embodiment of the invention described herein provides many of the features first described in U.S. Pat. No. 5,047,867 which is owned by the assignee of the instant application and which has common inventorship with the instant application. The '867 patent describes the manner in which portions of memory can be used to store various categories of programming information. For example, a first memory portion can store, in the form of a database, information related to future television programs, as well as information concerning those programs which are preferred by the user. By accessing this database, the user can display "Future Programs" as well as "Favorite Broadcast Programs" using a system of advanced menus and displays incorporating PIP, and an expanded channel ring. The techniques for providing information from specific databases to the user, described in the '867 application can be readily adapted to the display requirements of the instant invention and are incorporated by reference herein.

Figure 1:
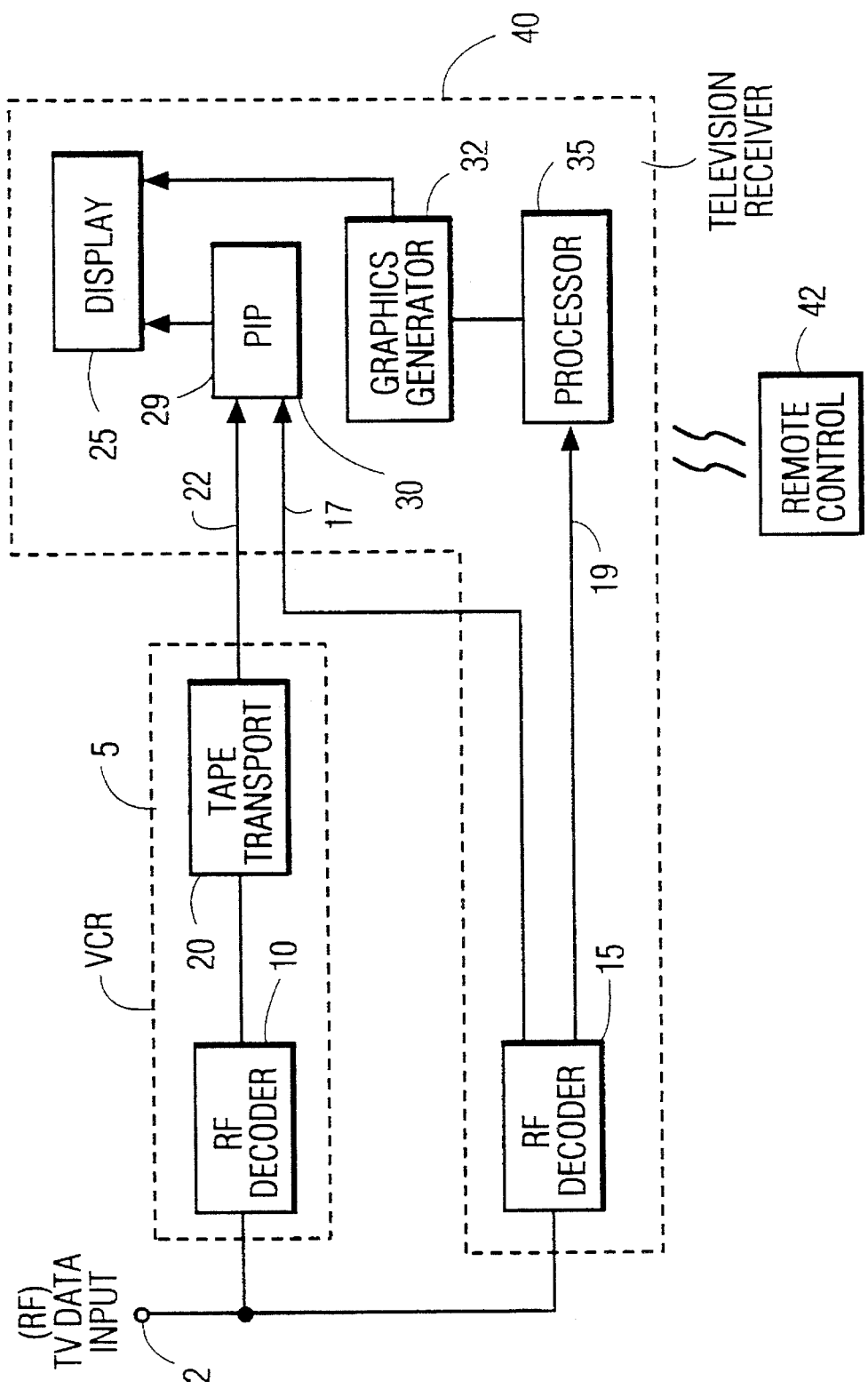
FIG. 1 is a block diagram of a system comprising a preferred embodiment of the invention.

FIG. 1 describes in block diagram form, a preferred embodiment of the invention. In this embodiment, it is assumed that program material as well as ECI data representing items of merchandise offered for sale to the viewer are provided for example, via a digital transmission system which carries compressed audio/video programming data (for example in using the MPEG and MUSICAM formats). This information can be updated periodically.

The arrangement described in FIG. 1, is for example only and it should be understood that the various block elements can be separate, or integrated into larger apparatus as shown, and still be within the province of the invention. Digital data comprising A/V (audio/video program material) as well as ECI are provided to the system at input 2. This data can be provided as an RF signal either "over the air" or by one way or interactive (two way) cable, fiber optic, satellite or other appropriate means of delivery for such information. For purposes of this description, we will assume that the digital data is provided by a wideband or "fast digital" data channel thereby permitting ECI which can include text and pictorial information related to merchandise offered for sale to the viewer.

In the embodiment of the invention shown, a VCR 5 is used in conjunction with a television receiver 40. Both the VCR 5 and the receiver have RF decoders 10 and 15 respectively, which allows a combined display via PIP (picture in picture) circuit 30, of two decoded signals, or a combination of an off the air signal decoded by RF decoder 15, and a stored program from transport 20.

Remote control 42 is used by the viewer to control the VCR 5 and receiver 40 in the known fashion, and also provides input keys with which the viewer can indicate "liked" or "disliked" items of the ECI during the browsing mode described below.

Each of the decoders functions to demodulate and decode or otherwise process the A/V data, as described in more detail below. The output of RF decoder 10 can be recorded by tape transport 20, or passed on to receiver 40 via an auxiliary input. RF decoder 15, separates the ECI data provided by the RF signal input and provides the ECI data to processor 35. The A/V data decoded by RF decoder 15 is switchably coupled to PIP circuit 30 which is a known device which can provide two program sources and switch input programming between main and PIP display formats, to display 25. The ECI data is processed by processor 35, as described in detail below, in conjunction with graphics generator 35, to provide a text output which can be combined with the output of PIP 30 in display 25.

Figure 2:
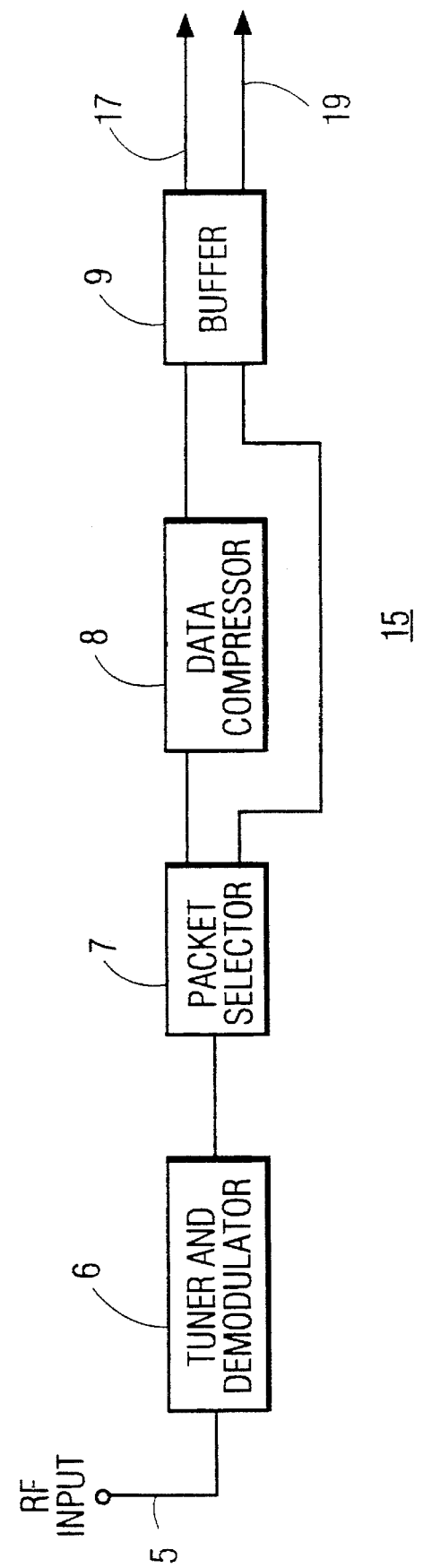
FIG. 2 is a block diagram describing one of the RF decoders shown in FIG. 1.

FIG. 2 is a more detailed block diagram of RF decoder 15. RF decoder 10 can be identical to RF decoder 15. In a fast data channel, data including the ECI can be provided in the form of packets comprising the A/V data in compressed form. The ECI can comprise audio and full motion video display of the items for sale, as well as text summary descriptions of features of each item.

The RF signal upon which the digital data is modulated, for example, is provided to tuner and modulator 6 which demodulates and separates the packets. Packet selector 7, separates the television program material packets from the ECI packets, using techniques well known in the digital signal processing art, and provides the compressed program data packets to data decompressor 8 and ECI data packets to buffer 9. Decompressor 8 decompresses the program data to provide audio and video television programming via buffer 9, to PIP circuit 30. It should be stated here that although the program data is presented in this example as being digital in form, it could also be analog information, thus eliminating the need for the packet selector (except to separate the ECI packets) and the data compressor.

The ECI consists of a database which can contain information about products offered for sale to the viewer, arranged, for example a text summary field comprising textual descriptions of respective products and service in paragraph form. Categories of information could include, for example, vendor, price, classification (i.e. sporting goods, fashion, consumer electronics, automobile, food, and tickets for concerts, plays, movies, sporting events etc.), catalog updates,(i.e. new products or special sales), television scheduling information for upcoming television shopping programs or infomercials, brochures available to viewers on request (i.e. print catalogs, consumer reports and other sources of product information). Other data fields could comprise still or full motion video illustrations of the described products.

Figure 3:
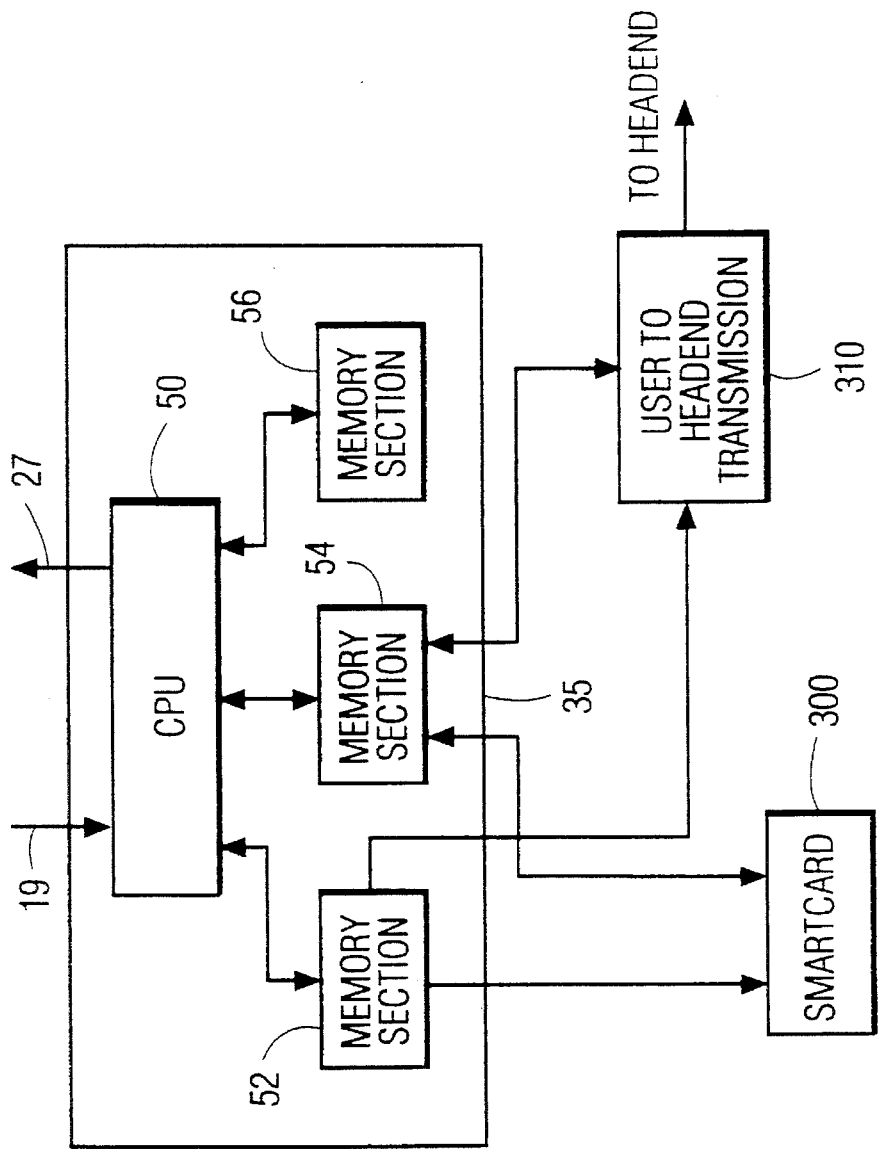
FIG. 3 is a block diagram of the processor shown in FIG. 1.

Processor 35 is shown in more detail in FIG. 3. It comprises a CPU 50, programmed to perform memory addressing functions necessary to set up and control read/write instructions to volatile memory configured into three sections, to contain respectively a first database 52, a second database 54 and a third database 56. CPU 50 also is programmed to accept positive and negative feedback from the viewer via remote control 42, and use this feedback in conjunction with one or more of the databases 52, 54, and 56, as described below. In addition, CPU 50 is programmed to perform "free text" search operations as detailed in the Stanfill and Kahle reference incorporated herein, on one or more of the databases 52, 54 or 56.

Database 52 is used to store the ECI data records downloaded and periodically updated. Database 54 is used to store records selected from the ECI database 52 which are indicated as "liked" by the user (i.e. for which the user provided positive feedback) or "disliked" by the user (i.e. for which the user provided negative feedback). By "like" or "dislike" we mean any type of positive or negative reaction, for example of interest, or not of interest, too expensive, reasonably priced, or any other positive or negative reaction by the viewer.

The "liked" or "disliked" indications can be made in several ways. The '867 patent describes the use of an expanded channel ring and display system to allow a user to browse through a group of records. These techniques can also be used in conjunction with the databases 52, 54 and 56, to display the information stored therein.

While in the browsing mode, the viewer can sequentially scan the ECI data records stored in database 52 beginning with a record R which represents the first of the ECI data records in database 52.

Figure 4:
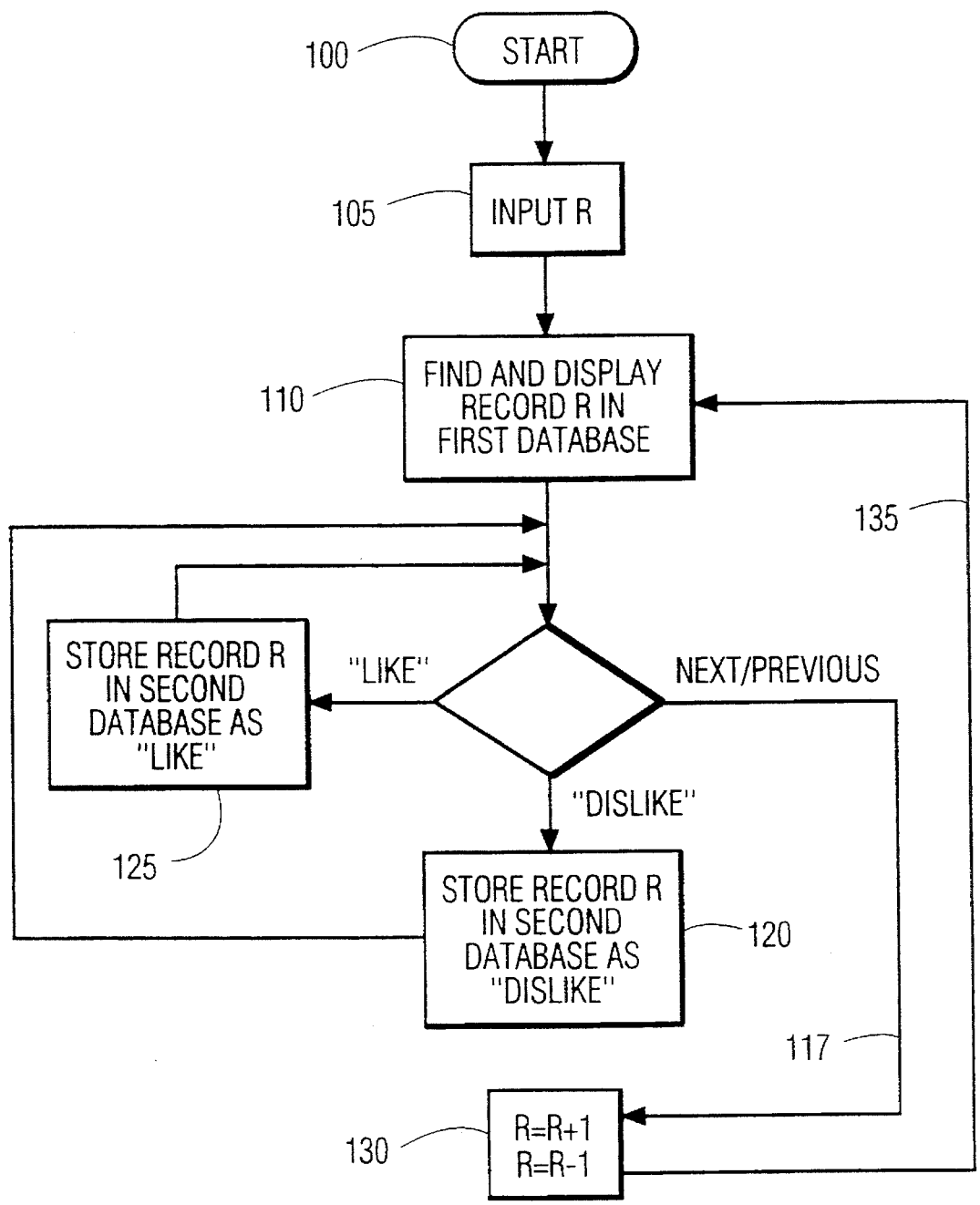
FIG. 4 is a flow diagram illustrating the browsing mode.

FIG. 4 is a flow chart which describes the browsing process. The "liked" or "disliked" indications can be made in several ways. The browsing sequence begins 100 when the viewer presses a "start" or "browse" button on the remote control 42 which directs CPU 50 to begin addressing the first database (i.e. memory section 52).

In a manner similar to the display processes described in the '867 patent, the information for the first data record R in the first database is displayed 110. The PIP circuit 30 can also be controlled in known fashion by the viewer using remote control 42 and the chosen data record can be displayed as text or graphic information superimposed over the pictures provided by PIP circuit 30, or can replace the picture provided by PIP circuit 30 altogether. These modifications are to be understood as variations of the invention as described herein.

Upon viewing the selected ECI data record R, the viewer can then register whether or not he "likes" or "dislikes" the displayed selection 115. We use the terms "like" and "dislike" to represent any type of positive or negative feedback which the viewer might input. For example, a "like" response could be made by the viewer pressing a button placing an order for the item via an interactive ("two way") cable system. Known systems exist for use with such systems to select "pay per view" movies and can easily be adapted to use as a mechanism for indicating an item for purchase. It could also simply be made by the keypress of a "like" button on remote control 42. If an ECI record describes schedule information about a particular shopping program or infomercial, a "like" response could also be made by the viewer pressing a button indicating that the program is to be recorded.

By inputting a "like" response, a flag is set in the record and then stored, along with that record, in the second database (in memory section 54). A negative response by the viewer can similarly be made by pressing a button on the remote control 42 marked "dislike" which would set a corresponding flag in the record which is stored with the record in the second database 120. The aim is to create as the second database 125, a database containing only those items in the ECI database 52 for which the viewer has a clear preference or dislike. This second database represents an "interest profile" of the viewer.

After registering "like" or "dislike" for a displayed record, the user can continue to search other records by incrementing or decrementing R depending on whether he wants to go forward or backward within the selected records. The new R is then used to find a second record and display it to the viewer 135. If the viewer has no opinion (i.e. neither "like" or "dislike") she can simply press "next/previous" on remote control 42 to select a prior (or subsequent) record 117, 130. "Liked" can also be recorded in the second database automatically as the viewer watches and/or records particular shopping programs or infomercials in real time. In other words, at the option of the viewer, merely watching and/or recording a shopping program for longer than a given amount of time (for example, at least 15 minutes), would automatically register as a "like" response and cause the record in first database corresponding to the selected program, to be stored in the second database 125.

Figure 5:
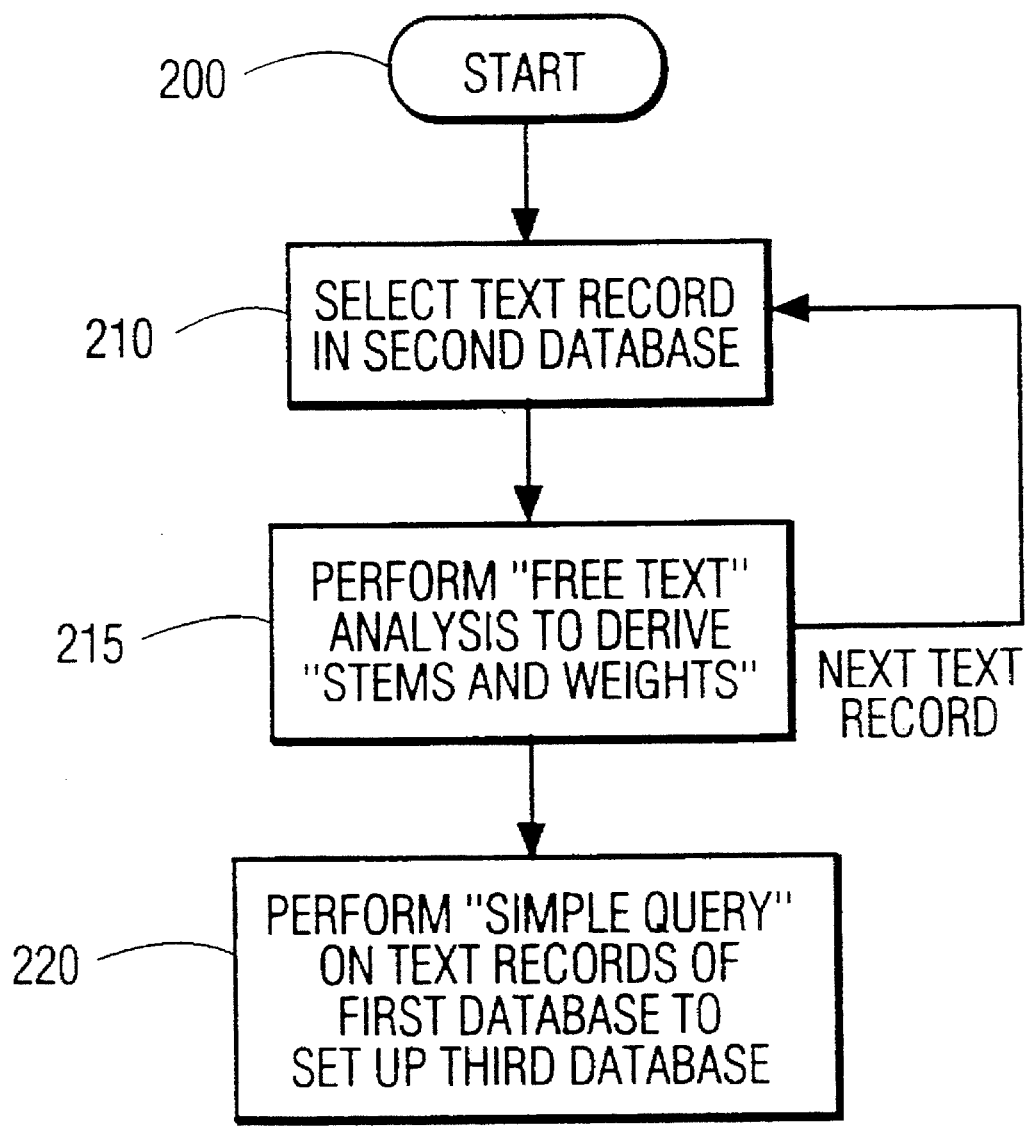
FIG. 5 is a flow diagram illustrating the interest matcher mode.

The purpose of developing the second database, is to enable the user to develop a personalized information database in a third database stored in memory section 56. This third database, could be accessed by the viewer via remote control 42, in order to allow him to select for viewing, only ECI data records which correspond either to records stored in the second database and indicated as "liked", or programs automatically selected from the first database in the interest matcher mode described in FIG. 5. The user can initiate the interest matcher mode 200 either by pressing the appropriate button on remote control 42, or by simply turning on the television receiver, or each time the downloaded ECI database 52 is updated.

The field containing the text summary of each record stored in the second database is analyzed in accordance with the "free text" search techniques described and the references incorporated herein 210, 215. This text summary would typically describe an item being offered for sale and can include the category of item, i.e. sporting goods, fashion, consumer electronics, automobile, food, and tickets for concerts, plays, movies, sporting events etc., catalog updates,(i.e. new products or special sales), television scheduling information for upcoming television shopping programs or infomercials, or brochures available to viewers on request (i.e. print catalogs, consumer reports and other sources of product information). Unimportant words like "a", "the" etc are removed. The remaining words are reduced to their stems (i.e. prefixes and suffixes are removed). Each stem in each "liked" record is given a positive weight. Each stem in each "disliked" record, which is not simultaneously a stem in a "liked" record is given a negative weight. With these stems and weights a "simple query" is performed over the ECI data records provided from the first database, i.e. the downloaded ECI database.

In the "simple query" 220, every record in the first database is scored (for potential retrieval value) by adding up the weights for the word stems it contains. The total score is then normalized with respect to the length of the respective text record. Additional techniques can be used to speed up this query, in particular, the "surrogate coding" described in the Stanfill & Kahle reference incorporated herein. Different weight values could also be assigned for different types of viewer "like" inputs, for example purchasing an item would be assigned a weight of 5. Marking an ECI record R as "liked" using the remote during browsing would be assigned a value of 4. Viewing a complete record would be assigned a value of 3. Those records having the highest retrieval values (i.e. weights) are taken as suggestions and are stored in chronological order along with those records actually flagged by the viewer as "liked", in the third database. The third database can then be accessed by the viewer as a personalized version of the downloaded ECI database initially stored in the first database, i.e. a Personalized Electronic Shopping Information database.

The second database 52 containing the "interest profile" of the viewer or the third database 54 containing the Personalized Electronic Shopping Information database can also be downloaded to a removable memory (i.e. "smartcard" 300) or directly to a cable headend using known transmission methods 310 used in interactive systems. The downloaded information can then be sold to, and utilized by, vendors to accumulate sales research.

Thus, the invention provides a method for allowing the user to correlate his or her preferences, in an automatic fashion using, for example, "free text" searching techniques, in order to generate a Personalized Electronic Shopping Information database.

In case of a two-way interactive system (e.g. two-way cable, telephone system, etc.) the processor and databases of FIG. 3 can be located at the headend (cable company or telephone company), or be distributed between the headend and the TV set.

While the invention has been described in its preferred embodiment, it is to be understood that the words which have been used are words of description rather than of limitation and that changes within the purview of the appended claims may be made without departing from the true scope and spirit of the invention in its broader aspects.

We claim:

1. An apparatus for providing a personalized information database for use in a system comprising means for receiving, storing and displaying an electronic information database comprising a plurality of summary records, said apparatus comprising:

means for selecting, and indicating preference or dislike for, first selected records of said summary records;

means for storing said first selected records;

means for analyzing said first selected records to isolate first search information;

means for using said first search information to select second selected records from said summary records; and means for storing said second selected records so as to form said personalized information database.

2. The apparatus of claim 1 wherein said analyzing means comprise means for performing a free-text search.

3. The apparatus of claim 1 wherein said summary records comprise information about items for sale, and said personalized information database represents the preferences of a consumer with respect to said items for sale.

4. The apparatus of claim 1 wherein said means for storing said second selected records is removable.

\* \* \* \* \*